United States Patent [19]

Numaguchi et al.

[11] 4,218,959
[45] Aug. 26, 1980

[54] PRESSURE REGULATING DIAPHRAGM

[75] Inventors: Toru Numaguchi, Tokyo; Katuyoshi Murabayashi, Yokohama, both of Japan

[73] Assignee: Daicel Ltd., Osaka, Japan

[21] Appl. No.: 5,665

[22] Filed: Jan. 22, 1979

Related U.S. Application Data

[63] Continuation of Ser. No. 783,235, Mar. 31, 1977, abandoned.

[30] Foreign Application Priority Data

Apr. 7, 1976 [JP] Japan .................................. 51-39567

[51] Int. Cl.³ .......................... F01B 19/00; F16J 3/00
[52] U.S. Cl. .................................. 92/103 SD; 92/98 D
[58] Field of Search ............ 92/98 R, 98 D, 99, 103 R, 92/103 SD, 104, 105, 181 P; 428/474.9; 73/269, 279

[56] References Cited

U.S. PATENT DOCUMENTS

| | | | |
|---|---|---|---|
| 2,307,066 | 1/1943 | Paulus | 92/103 R |
| 2,646,077 | 7/1953 | Whitney | 92/103 SD |
| 2,678,065 | 5/1954 | Crookston | 92/103 SD |
| 2,715,418 | 8/1955 | Van Derbeck | 92/98 R |
| 3,011,758 | 12/1961 | McFarland, Jr. | 92/104 |
| 3,288,664 | 11/1966 | Hoppe | 428/474.9 |
| 3,327,322 | 6/1967 | Norton | 92/98 R |
| 3,534,500 | 10/1970 | Boehm | 92/98 R |
| 3,824,903 | 7/1974 | Hahn | 92/99 |
| 3,874,052 | 4/1975 | Schantz | 92/103 SD |

Primary Examiner—Abraham Hershkovitz
Attorney, Agent, or Firm—Blanchard, Flynn, Thiel, Boutell & Tanis

[57] ABSTRACT

A pressure regulating diaphragm comprises a central base plate section in the form of a hard disc, a peripheral sealing section having the form of a ring located concentrically with said plate section and an intermediate section located between said peripheral sealing section and said central base plate section, said intermediate section consisting of a film having a thickness of from 10 to 100 microns and made of a plastic resistant to chemicals and defining a deformable, flexible portion, whereby a desired shape can be obtained therein.

6 Claims, 7 Drawing Figures

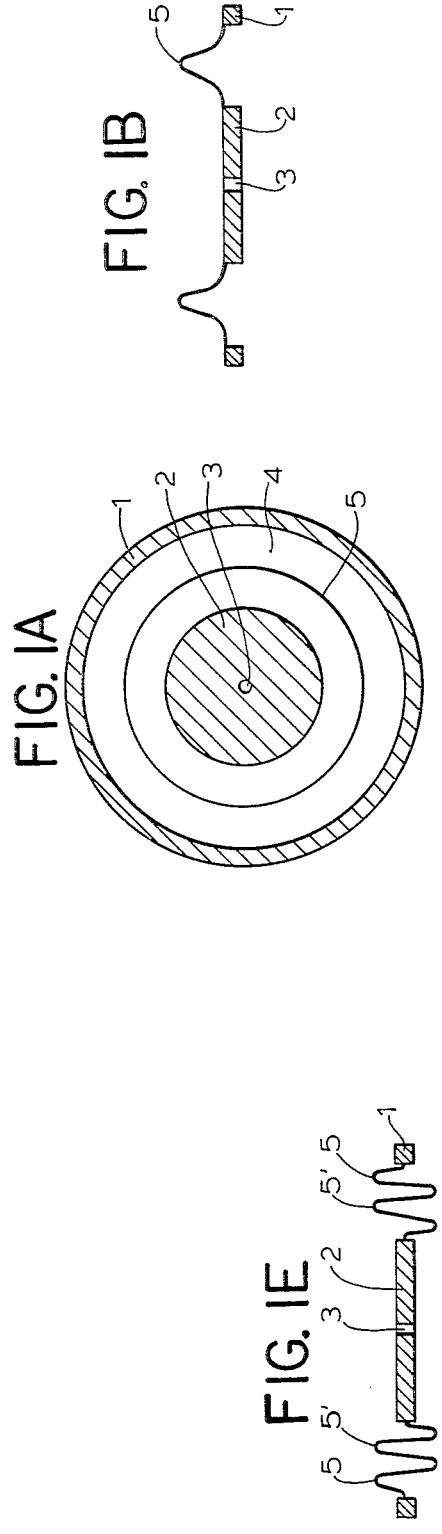
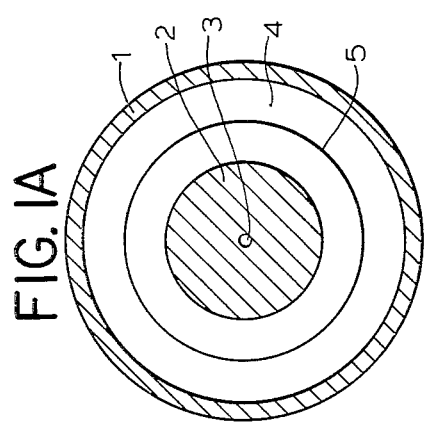
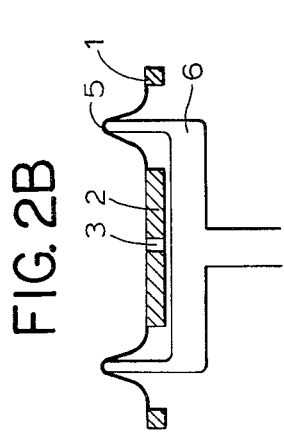
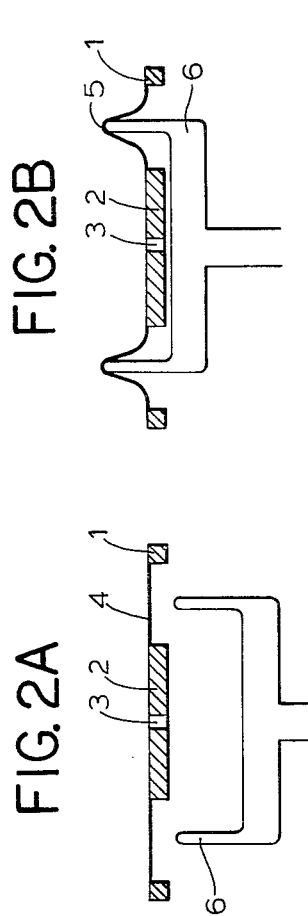
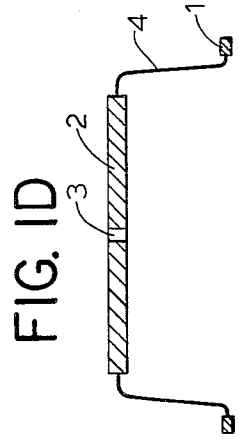
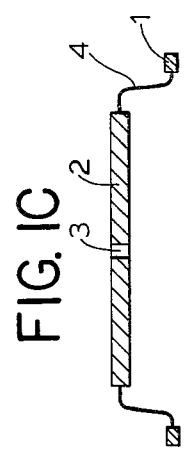

PRESSURE REGULATING DIAPHRAGM

This is a continuation of application Ser. No. 783,235, filed Mar. 31, 1979, now abandoned.

BACKGROUND OF THE INVENTION

1. Field of the Invention

The present invention relates to an improved pressure regulating diaphragm (hereinafter, referred to simply as the "diaghragm").

2. Description of Prior Arts

In general, the diaphragm undergoes a deformation or deflection in accordance with the pressure applied thereto, so as to compensate for changes in the pressure. Most conventional diaphragms are made of rubber.

However, the diaphragms made of rubber have a fundamental drawback of poor resistance against chemicals which substantially deteriorates their durability.

Namely, the deflectable or deformable nature of the diaphragm is lost, as well as the airtightness, during long time use thereof, resulting in an unsatisfactory pressure-regulating function and unfavourable leakage of gas, which may cause an explosion.

It is true that various types of diaphragms made of chemicals-resistant plastics have been proposed.

However, these diaphragms have poor deflectable or deformable properties. No diaphragm made of a plastic has attained a good pressure regulating function equal to or higher than that of diaphragms made of rubber.

SUMMARY OF THE INVENTION

Under these circumstances, the present inventors have made an intense study to obtain a diaphragm made of a chemicals-resistant plastic and improved to avoid the above described drawback of the prior art.

Thus, the present inventors have completed the invention by obtaining a diaphragm having a greatly improved durability and a deflectable nature well exceeding that of the conventional rubber diaphragm thereby ensuring a much improved pressure regulating function, easily and at a reasonable cost.

According to the invention, there is provided a diaphragm employing a film made of a chemicals-resistant plastic and having a thickness between 10 and 100 microns, on which a hard peripheral sealing section and a hard disc-like central base plate section are unitarily secured, wherein the intermediate section between the peripheral sealing section and the central base plate section is formed into a deformable, flexible portion of plastic film having any desired shape as mentioned later.

BRIEF DESCRIPTION OF DRAWINGS

FIG. 1A is a horizontal sectional view and FIGS. 1B and 1E are vertical sectional views of a diaphragm embodying the invention having a protrusion or protrusions formed in the intermediate deformable part.

FIGS. 1C and 1D are horizontal sectional views of another embodiment of the invention in which the intermediate deformable part is elongated to have a disk-like shape, wherein the extent of the elongation is moderate and large in the cases of FIGS. 1C and 1D, respectively.

FIGS. 2A and 2B exemplarily show in vertical section the process for forming protrusions in the intermediate deformable portion of the film by the use of an elongation guide, before and after the use of the guide.

In the drawings, 1 is a peripheral sealing section, 2 is a central base plate section, 3 is a central bore, 4 is a intermediate deformable section of the film, 5,5′ are protrusions of the deformable section, and 6 is an elongation guide.

The invention will be described in more detail with specific reference to the drawings showing embodiments of the invention.

Referring to the drawings, a diaphragm of the invention comprises a film made of a plastic having a good chemical resistance, sufficient airtightness, and good deformability, and it is from 10 to 100 microns in thickness.

As will be seen in FIGS. 1, (A-E), the outer peripheral sealing section 1 is a peripheral supporting portion and the central base section 2 is a flat plate. Both are made of a hard thermoplastic resin and are united with the plastic film defining the intermediate portion 4. Thereafter the intermediate section 4 of the film between the peripheral sealing section 1 and the central base plate section 2 is uniformly stretched, and is formed to have one or more concentric projections 5 as shown in FIG. 1A, 1B or 1E so as to form a deformable portion.

Alternatively, the deformable portion may be formed to have a disc-like shape stretched uniformly, as shown in FIG. 1C or 1D.

In order to unitarily form the peripheral hard sealing section 1 and the central base plate section 2 together with the deformable intermediate section of thermoplastic resin film, the following procedure may be used.

At first, a previously and separately prepared plastic film having a thickness of 10 to 100 microns is set in the mold of an injection molding machine. Then, the peripheral sealing section 1 and the central base plate section 2 are injection-molded onto the previously set plastic film so as to be united with the film by fusion welding.

Alternatively, the peripheral sealing section 1 and the central base plate section 2 may be joined to the plastic film by an adhesive, or by means of bonding with pressure and heat.

In order to obtain protrusions 5,5′, etc. at the intermediate deformable section, various heat-treating methods can be used. An elongation guide 6 as shown in FIGS. 2A and 2B may be used. In this case, a heat-elongation method is adopted, by fixing the peripheral sealing section 1 and the central base plate section 2 and then moving the guide 6 in the direction perpendicular to the surface of the film.

FIG. 2A and FIG. 2B show illustrations before and after use of the elongation guide 6, respectively.

The process as in FIGS. 2A and 2B may be used also to form a diaphragm having the shape of a shallow, more or less concave vessel as shown in FIGS. 1C and 1D.

The diaphragm according this invention exhibits an improved durability and airtightness, as well as an enhanced deformability, in spite of its relatively low cost of manufacture.

The diaphragm can be prepared by a novel method of the invention in which the hard peripheral sealing section 1 and the hard central base plate section 2 are suitably joined to a thin film of 10 to 100 microns thickness which cannot be formed by usual measures, such as injection molding and then the intermediate deformable section is uniformly elongated to have at least one protrusion or a concave shape, by means of use of a film elongation guide.

Concerning the shape of the intermediate deformable section, the provision of at least one concentric protrusion 5 is preferred to obtain better deforming or deflection in the final diaphragm.

As for the thickness of the chemical-resistant plastic film used in the invention, at least 10 microns of thickness is necessary to ensure an acceptable strength of the diaphragm and also from the view point of recent techniques for manufacturing thin films, a thickness exceeding 100 microns causes a deterioration in the fine adjustability of the diaphragm and, therefore, should be avoided.

Plastics used in the invention as materials for the diaphragm must have following properties.

Namely, for the film portion, the required material must be able to be formed into a thin film, and in addition, it must have sufficient chemical-resistant property, airtightness and deformability. Practically, polyamide resins of are preferably used. More specifically, in order to obtain smoother deflection or deformation of the diaphragm, copolymeric resins such as nylon 6/12 or 6/6 are preferably used, rather than homopolyamides.

As to the peripheral sealing section and the central base plate section, the material therefor must be such that it can be joined to the above mentioned plastic film by fusion welding, or by means of an adhesive. The peripheral sealing section and the central base plate section can be made of polyamide, such as nylon 6/12 and nylon 6/16.

Since these sections have sufficient thickness to support the diaphragm, the requirements of chemical-resistance and airtightness are not so critical as in case of the intermediate film portion.

The diaphragm of the invention is applicable to various uses, for example, gas combustion means such as a gas stove or gas boiler, and automobile parts, in addition to ordinary uses such as a pressure regulator for a gas bomb.

The diaphragm of this invention is used by securing the peripheral section 1 onto a valve housing and connecting the central plate section 2 at the central bore 3 with a rod, which is connected at the other end with a valve-operating means.

The embodiments of the invention in which an exclusive property or privilege is claimed are defined as follows:

1. A pressure regulating diaphragm including:
   an airtight, deformable, flexible thin member, said flexible member having a central portion and at least one annular, axially deformed and axially flexible deformable portion spaced radially between its central portion and edge,
   a hard central member at the central portion of said flexible member,
   an annular peripheral seal member of hard thermoplastic resin bounding the edge of said flexible member and coaxially spaced outboard of and surrounding said axially deformed portion of said flexible member and of said central member;
   in which the improvement comprises the flexible member being a polyamide film having a thickness in the range of 10 microns to 100 microns,
   said central member and peripheral seal member respectively being a polyamide disc and polyamide rim injection molded on the central portion and edge of said polyamide film, said disc being spaced coaxially inboard of said annular deformed portion of said film, said disc and rim being substantially coplanar and said annular deformed portion being reversely curved and projecting transversely therefrom to a distance exceeding the thickness of said hard polyamide disc and rim.

2. A pressure regulating diaphragm as claimed in claim 1, in which said polyamide is selected from the group consisting of nylon 6/12 and nylon 6/6.

3. A pressure regulating diaphragm as claimed in claim 2, in which said disc has a central bore therethrough.

4. A pressure regulating diaphragm including:
   an airtight, deformable, flexible thin member, said flexible member having a central portion and at least one annular, axially deformed and axially flexible deformable portion spaced radially between its central portion and edge,
   a hard central member at the central portion of said flexible member,
   an annular peripheral seal member of hard thermoplastic resin bounding the edge of said flexible member and coaxially spaced outboard of and surrounding said axially deformed portion of said flexible member and of said central member;
   in which the improvement comprises the flexible member being a polyamide film having a thickness in the range of 10 microns to 100 microns,
   said central member and peripheral seal member being polyamide members and with said central member being a disc fixed on said film and spaced radially inboard from said annular deformable portion,
   said disc being of thickness substantially greater than said film but substantially less than said axial deformation of said annular deformed portion of said film, said annular deformed portion extending substantially perpendicularly to said disc so that the diaphragm is substantially cup-shaped in cross section with said disc forming the base wall thereof.

5. A pressure regulating diaphragm as claimed in claim 4, in which said polyamide is selected from the group consisting of nylon 6/12 and nylon 6/6.

6. A pressure regulating diaphragm as claimed in claim 5, in which said disc has a central bore therethrough.

* * * * *